United States Patent [19]

Shiobara et al.

[11] Patent Number: 5,179,176
[45] Date of Patent: Jan. 12, 1993

[54] PROPENYL GROUP-CONTAINING EPOXY RESIN

[75] Inventors: Toshio Shiobara; Hisashi Shimizu; Takayuki Aoki, all of Annaka, Japan

[73] Assignee: Shin-Etsu Chemical Company, Ltd., Tokyo, Japan

[21] Appl. No.: 649,027

[22] Filed: Feb. 1, 1991

[30] Foreign Application Priority Data

Feb. 2, 1990 [JP] Japan .................................. 2-23837

[51] Int. Cl.⁵ ...................... C07D 303/27; C08G 59/32
[52] U.S. Cl. ......................... 525/502; 528/98; 528/101; 525/476; 525/481; 525/487; 525/507; 523/443; 523/466
[58] Field of Search ................ 528/98, 101; 525/502, 525/507, 476, 481, 487; 523/443, 466

[56] References Cited

U.S. PATENT DOCUMENTS

| | | |
|---|---|---|
| 2,965,607 | 12/1960 | Martin et al. .................. 528/106 |
| 2,965,608 | 12/1960 | Martin et al. .................. 528/87 |
| 4,384,129 | 5/1983 | Zahir et al. ..................... 528/101 |
| 4,390,664 | 6/1983 | Kanayama et al. ............ 525/507 |
| 4,677,170 | 1/1987 | Monnier et al. ................ 525/539 |

OTHER PUBLICATIONS

Journal of American Chemical Society, pp. 1709–1713 (1956).

*Primary Examiner*—John C. Bleutge
*Assistant Examiner*—Frederick Krass
*Attorney, Agent, or Firm*—Birch, Stewart, Kolasch & Birch

[57] ABSTRACT

An epoxy resin having a propenyl group conjugated with an aromatic ring is heat resistant and is easily molded and cured into products having high strength and Tg. It is thus useful as a resin component or modifier.

10 Claims, 3 Drawing Sheets

PROPENYL GROUP-CONTAINING EPOXY RESIN

This invention relates to an epoxy resin having a propenyl group conjugated with an aromatic group.

BACKGROUND OF THE INVENTION

Epoxy resins have been widely used as various dielectric and structural materials in casting, impregnating, laminating and molding techniques. In these fields, increasingly severe requirements are imposed on such materials. Heat resistance is one of key features desired of such materials.

Prior art well-known heat resistant epoxy resins include a variety of polyepoxidized resins, for example, epoxidized phenol novolak resins (e.g., Epikote 154 commercially available from Yuka Shell Epoxy K.K.), epoxidized cresol novolak resins (e.g, EOCN commercially available from Nihon Kayaku K.K.), methylenedianilinetetraepoxide, and epoxidized tri and tetra(hydroxyphenyl)alkanes.

The heat resistance of these polyepoxidized resins are relatively high, but still unsatisfactory in practice. They require long-term heating at elevated temperatures before they gain an acceptable strength, and are less satisfactory in processability.

SUMMARY OF THE INVENTION

An object of the present invention is to provide a new and improved epoxy resin which is a useful component of various resin compositions and a useful modifier for various resins, has improved processability and heat resistance, and cures to products having high strength.

The inventors have found that by isomerizing, polymerizing and then epoxidizing a phenol compound, there is obtained an epoxy resin having a propenyl group conjugated with an aromatic group of the general formula (1):

wherein $R^1$ is hydrogen or a substituted or unsubstituted monovalent hydrocarbon group having 1 to 11 carbon atoms, X is hydrogen or a halogen atom, letters l and m are integers of 0 to 50, with the proviso that m is an integer of 1 to 50 when l=0, and l is an integer of 1 to 50 when m=0. This epoxy resin possesses good processability and is easily moldable. The resins cure to products having resistance against heat and thermal degradation over a long time and high strength so that they are useful for the encapsulation of semiconductor devices. The epoxy resin having a propenyl group conjugated with an aromatic group is highly reactive with silylidyne (≡SiH) groups of organic silicon compounds and vinyl, epoxy and phenolic hydroxyl groups of various organic compounds and thus useful in tailoring organopolysiloxanes, maleimide resins, other epoxy resins and phenol resins having such functional groups.

Briefly stated, the present invention provides a propenyl group-containing epoxy resin of formula (1).

DETAILED DESCRIPTION OF THE INVENTION

The propenyl group-containing epoxy resins of the present invention are epoxy resins having a propenyl group conjugated with an aromatic ring which are represented by the following general formula (1).

In the formula, $R^1$ is hydrogen or a substituted or unsubstituted monovalent hydrocarbon group having 1 to 11 carbon atoms, preferably 1 to 6 carbon atoms, for example, methyl, ethyl, propyl, t-butyl, propenyl, and phenyl groups. X is hydrogen or a halogen atom, for example, chlorine and bromine. Letters l and m are integers of 0 to 50, preferably 0 to 10, with the proviso that both l and m are not equal to 0 at the same time. That is, m is an integer of 1 to 50, preferably 1 to 10 when l=0, and l is an integer of 1 to 50, preferably 1 to 10 when m=0.

The epoxy resins of formula (1) having a propenyl group conjugated with an aromatic ring, that is having a propenyl group as a functional group in a molecule thereof are capable of a radical reaction with organic compounds having a vinyl group as well as an addition reaction with organic silicon compounds having a silylidyne (≡SiH) group and organic compounds having an epoxy or phenolic hydroxyl group. The epoxy resins of formula (1) are thus useful modifiers for other epoxy resins, phenol resins, maleimide resins, and organopolysiloxanes.

The propenyl-containing epoxy resins of the invention can be readily synthesized by isomerizing and polymerizing phenols followed by epoxidization.

The starting phenols may be ones corresponding to the end propenyl-containing epoxy resins, for example, 2-allyl-substituted phenols.

Isomerization of phenols is preferably carried out by the alkali isomerization method described in Journal of American Chemical Society, pages 1709–1713 (1956).

Isomeric phenols are then polymerized into novolak compounds, for example, by reacting the phenols with aldehydes in the presence of well-known alkali or acid catalysts.

The aldehydes used herein include formaldehyde and salicylaldehyde, to name a few. The amount of aldehyde used is not particularly limited although the molar ratio of aldehyde to phenol reactants preferably ranges from 0.05/1 to 1/1, more preferably from 0.11/1 to 0.7/1. An aldehyde/phenol molar ratio of less than 0.05 would result in a lower polymer whereas a ratio of higher than 1 would invite gelation.

The alkali catalysts used herein include KOH, NaOH, Ca(OH)$_2$, Na$_2$CO$_3$, Ba(OH)$_2$, Sr(OH)$_2$, and LiOH, as well as dimethylamine, methylamine, hexamethylenetetramine, ammonia, trimethylamine, triethylamine, ethylamine, diethylamine, di-n-propylamine, isopropylamine, n-propylamine, pyridine, dibenzylamine, and benzylamine. The acid catalysts include hydrochloric acid, sulfuric acid, nitric acid, para-toluene sulfonic acid, butyric acid, propionic acid, oxalic acid, phosphoric acid, acetic acid, trichloroacetic acid, dichloroacetic acid, monochloroacetic acid, formic acid, boric acid, and lactic acid. The alkali or acid catalyst may be used in a catalytic amount, often 0.5 to 2% by weight based on the phenol reactant.

Polymerization reaction is preferably conducted in organic solvents such as toluene, xylene, cyclohexanol, isopropanol, n-butanol, ethanol, methanol, dioxane, tetrahydrofuran, methyl cellosolve, ethyl cellosolve, and carbitol as well as water. Reaction conditions are not particularly limited, but preferably include a temperature of 100° to 150° C. and a time of 4 to 8 hours.

It will be understood that a phenol may be either alkali isomerized prior to polymerization or polymerized prior to alkali isomerization.

The next step is epoxidization which may be carried out by well-known methods using epichlorohydrin, NaOH and the like.

The process for preparing the epoxy resins of the present invention will be described with reference to several examples.

As a first example, novolak epoxy resins having a propenyl group conjugated with an aromatic group of the following formula (2):

(2)

wherein n is an integer of 1 to 50 may be synthesized according to the following reaction scheme I or II.

In the above-illustrated reaction process, a starting reactant or a 2-allyl-substituted phenol is first alkali isomerized into a propenyl-substituted phenol and then reacted with formaldehyde in the presence of alkali/acid catalysts into a novolak form according to reaction scheme I, or first converted into a resol by a novolak method and then alkali isomerized according to reaction scheme II, and finally epoxidized.

During the novolak reaction according to reaction scheme I, the following side reaction takes place.

Letters n, p and q are integers.

The likelihood of this side reaction is increased when the acid catalyst used is a strong acid such as hydrochloric acid, sulfuric acid, nitric acid and p-toluene sulfonic acid. For controlling the side reaction, it is preferred to use an acid catalyst in the form of a weak acid having a pKa of 4.0 to 5.0 such as acetic acid, lactic acid and propionic acid.

In reaction scheme II, a 2-allyl-substituted phenol is first converted into a resol by a novolak method in the presence of a catalyst, preferably an alkali catalyst such as KOH and NaOH and a methine-forming catalyst such as hydrochloric acid, nitric acid, oxalic acid, and p-toluene sulfonic acid.

In the novolak step of reaction schemes I and II, the molar ratio of formaldehyde to phenol reactants preferably ranges from 0.4/1 to 1/1, more preferably from 0.5/1 to 0.7/1. An aldehyde/phenol molar ratio of less than 0.4 would result in a lower polymer whereas a ratio of higher than 1 would invite gelation.

As a second example, polyfunctional epoxy resins having a double bond conjugated with an aromatic group of the following formula (3):

wherein n is an integer of 0 to 50 may be synthesized according to the following reaction scheme.

The above illustrated reaction scheme uses salicylaldehyde as the aldehyde for polymerizing an allyl-substituted phenol. Salicylaldehyde is preferably used in such amounts that the molar ratio of salicylaldehyde to allyl-substituted phenol may range from 0.1/1 to 0.5/1, more preferably from 0.11/1 to 0.3/1. A molar ratio of salicyl-aldehyde/phenol of less than 0.1 would result in lower yield whereas a ratio of higher than 0.5 would result in a higher polymer.

As a third example, polyfunctional epoxy resins having a double bond conjugated with an aromatic group of the following formula (4):

wherein n is an integer of 0 to 50 may be synthesized according to the following reaction scheme.

In the above-illustrated reaction scheme, a polyphenol is converted into an allyl ether form, and then subjected to Claisen rearrangement, alkali isomerization, and finally epoxidization for synthesizing the end epoxy resin. This process permits for synthesis of a propenyl-containing epoxy resin of formula (4) in high yields with minimized side reaction.

As a fourth example, polyfunctional epoxy resins having a propenyl group conjugated with an aromatic group of the following formula (5):

may be synthesized according to the following reaction scheme.

In the above-illustrated reaction scheme, an allyl-substituted phenol is reacted with salicylaldehyde and formaldehyde in the presence of alkali/acid catalysts for polymerization. The reactants are preferably used in such amounts that the molar ratio of phenol/salicylaldehyde/formaldehyde may be 1:(0.05–0.25):(0.2–0.5). A larger proportion of salicylaldehyde and formaldehyde beyond this range would invite gelation whereas a smaller proportion would result in a lower polymer and/or a lower yield.

It is preferred to first react an allyl-substituted phenol with salicylaldehyde for conversion into a resol and then with formaldehyde since salicylaldehyde has slower reactivity than formaldehyde.

The propenyl-containing epoxy resins of the invention are easily processable and highly reactive with other epoxy resins, phenolic resins, maleimide resins and the like, and cure into products having improved mechanical properties at elevated temperatures, heat resistance, long-term thermal degradation resistance, and high strength. Therefore, the epoxy resins of the invention can be useful components of various resin compositions and useful modifiers for various resins.

EXAMPLE

Examples of the present invention are given below by way of illustration and not by way of limitation. All percents are by weight unless otherwise stated.

EXAMPLE 1

Synthesis of Compound A

A 1-liter, four-necked flask equipped with a condenser, thermometer, and stirrer was charged with 90 grams of allylphenol in a nitrogen atmosphere. With stirring, 100 grams of methanol and 50 grams of n-butanol were added, and then 61 grams of KOH added. The flask was heated until the contents were dissolved, the methanol removed, and then reaction conducted at 110° to 120° C. for 6 hours. At the end of 6-hour reaction, 200 ml of methyl isobutyl ketone (MIBK) was added to the reaction solution which was neutralized with hydrochloric acid. Removal of the solvent left 80 grams of 2-propenylphenol, designated Compound A, having a boiling point of 110° to 115° C. at 15 to 16 mmHg in a yield of 89%. Compound A was identified by NMR and IR analysis.

Compound A

Synthesis of Compound B

A 1-liter, four-necked flask equipped with a condenser, thermometer, and stirrer was charged with 134 grams (1.0 mol) of 2-propenylphenol and 45 grams (0.55 mol) of 37% formaldehyde aqueous solution in a nitrogen atmosphere. With stirring, 1.0 gram of NaOH was added and reaction conducted for 6 hours under reflux. Then, 2.4 grams of oxalic acid and 100 grams of toluene were added to the flask and the reaction mixture was heated under toluene reflux for removing water. At the end of 2-hour heating, the toluene was removed under vacuum and reaction conducted at 150° C. for one hour. Then the reaction mixture was cooled down, diluted with MIBK, washed with water, and removed of the solvent, leaving 112 grams of a compound, designated Compound B, having an OH equivalent of 153 (theory 146) in a yield of 77% based on the 2-propenylphenol. Compound B was identified by NMR and IR analysis.

Compound B n = 2-7

Synthesis of Compound C

A 1-liter, four-necked flask equipped with a condenser, thermometer, and stirrer was charged with 80 grams of the propenyl-containing phenol or Compound B (OH equivalent 146), 232 grams of epichlorohydrin, and 0.1 gram of trimethylammonium chloride. The contents were stirred for 3 hours under reflux. Then 41.5 grams of NaOH (50% aqueous solution) was added dropwise under a vacuum of 100 to 130 mmHg at 80° to 90° C. The reaction mixture was then aged for 2 hours. After filtration and stripping, the hydrolyzable chlorine was removed from the reaction mixture using NaOH solution (10% aqueous solution). Washing with water left 102 grams of a reaction product, designated Compound C, having an epoxy equivalent of 211 (theory 202) and a softening point of 91° C. in a yield of 93%.

Compound C n = 2-7

Figure 1:
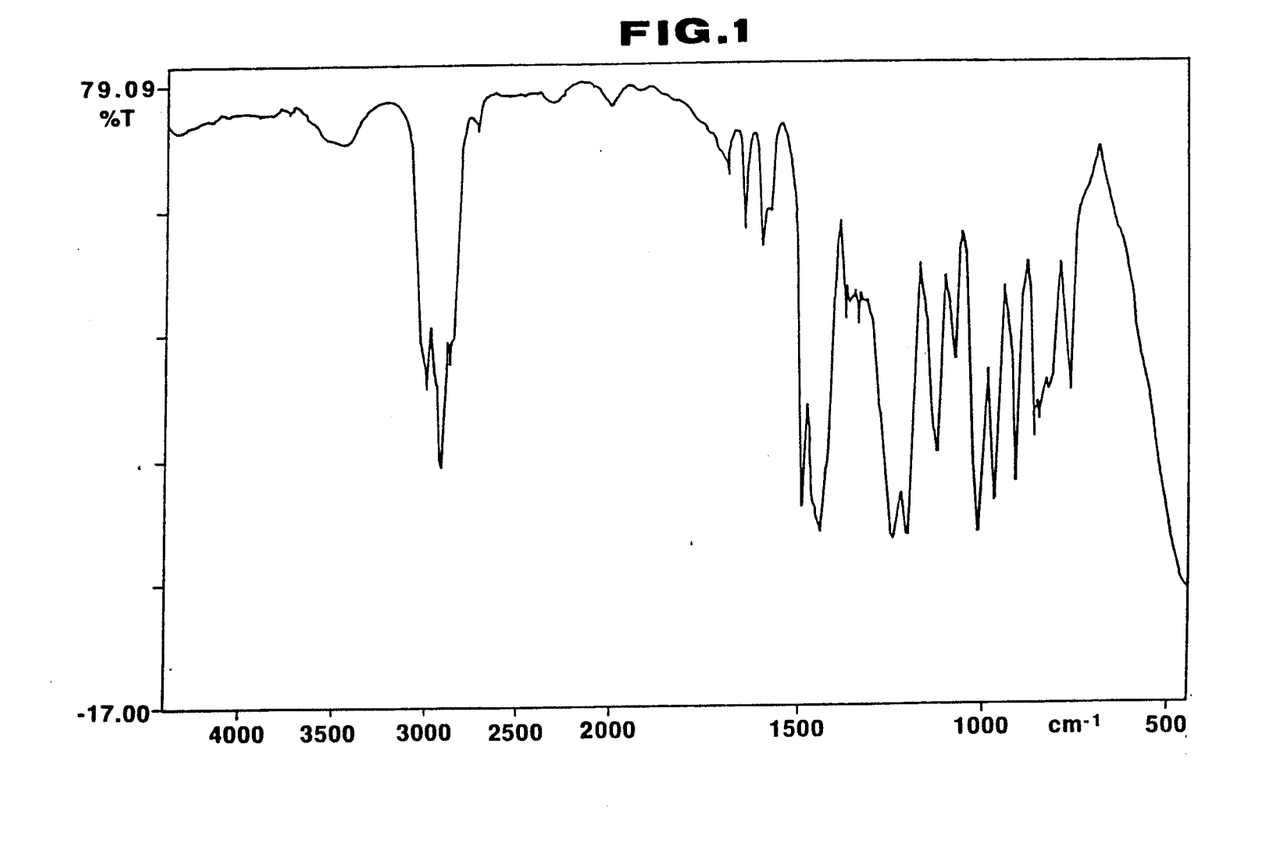
FIGS. 1 to 3 are diagrams showing IR spectra of compounds C, F and J according to the present invention, respectively.

FIG. 1 is an infrared absorption spectrum of Compound C. The compound was analyzed for molecular weight by gel permeation chromatography (GPC), finding a number average molecule weight (Mn) of 1,250, a weight average molecule weight (Mw) of 1,630, and a polydispersion degree (Mw/Mn) of 1.30. An NMR spectrum of the compound was analyzed as follows.

Solvent: $CD_3COCD_3$ ppm [σ]

1.67, 1.77:  —CH=CH—C$\underline{H_3}$ 2.59:  $-\overset{O}{\overset{/\,\backslash}{C\underline{H}-CH_2}}$ 3.17:  $-\overset{O}{\overset{/\,\backslash}{C\underline{H}-CH_2}}$ 3.6~4.0:  $-CH_2-\overset{O}{\overset{/\,\backslash}{CH-CH_2}}$ +C$_6$H$_2$—C$\underline{H_2}$+

5.6~6.2:  —C$\underline{H}$=C$\underline{H}$—CH$_3$

6.7~7.2:  +C$_6$$\underline{H_2}$+

EXAMPLE 2

Synthesis of Compound D

A 1-liter, four-necked flask equipped with a condenser, thermometer, and stirrer was charged with 134 grams (1.0 mol) of 2-allylphenol and 15.2 grams (0.125 mol) of salicylaldehyde in a nitrogen atmosphere. With stirring, 80 grams of NaOH (30% aqueous solution) was added. Reaction was conducted for 6 hours under reflux. At the end of reaction, 110 grams of hydrochloric acid and 100 grams of toluene were added and the reaction mixture heated for 2 hours under toluene reflux for removing water. At the end of 2-hour heating, the toluene was removed under vacuum and reaction conducted at 150° C. for one hour. Then the reaction mixture was cooled down, diluted with MIBK, washed with water, and removed of the solvent, leaving 39 grams of a compound, designated Compound D, having an OH equivalent of 133 (theory 130) in a yield of 81% based on the salicylaldehyde. Compound D was identified by NMR and IR analysis.

Compound D

Synthesis of Compound E

A 1-liter, four-necked flask equipped with a condenser, thermometer, and stirrer was charged with 40 grams of Compound D (OH equivalent 130) in a nitrogen atmosphere. With stirring, 100 grams of methanol and 50 grams of n-butanol were added, and then 23.8 grams of KOH added. The flask was heated until the contents were dissolved, the methanol removed, and then reaction conducted at 110° to 120° C. for 6 hours. At the end of 6-hour reaction, 200 ml of MIBK was added to the reaction solution which was neutralized with hydrochloric acid. Removal of the solvent left 36 grams of a compound, designated Compound E, having an OH equivalent of 134 (theory 130) in a yield of 90%.

Compound E was identified by NMR and IR analysis.

Compound E

Synthesis of Compound F

A 1-liter, four-necked flask equipped with a condenser, thermometer, and stirrer was charged with 40 grams of the propenyl-containing phenol or Compound E (OH equivalent 130), 137 grams of epichlorohydrin, and 0.05 grams of trimethylammonium chloride. The contents were stirred for 3 hours under reflux. Then 23.9 grams of NaOH (50% aqueous solution) was added dropwise under a vacuum of 100 to 130 mmHg at 80° to 90° C. The reaction mixture was then aged for 2 hours. After filtration and stripping, the hydrolyzable chlorine was removed from the reaction mixture using NaOH solution (10% aqueous solution). Washing with water left 45 grams of a reaction product, designated Compound F, having an epoxy equivalent of 192 (theory 187) in a yield of 81%.

Figure 2:
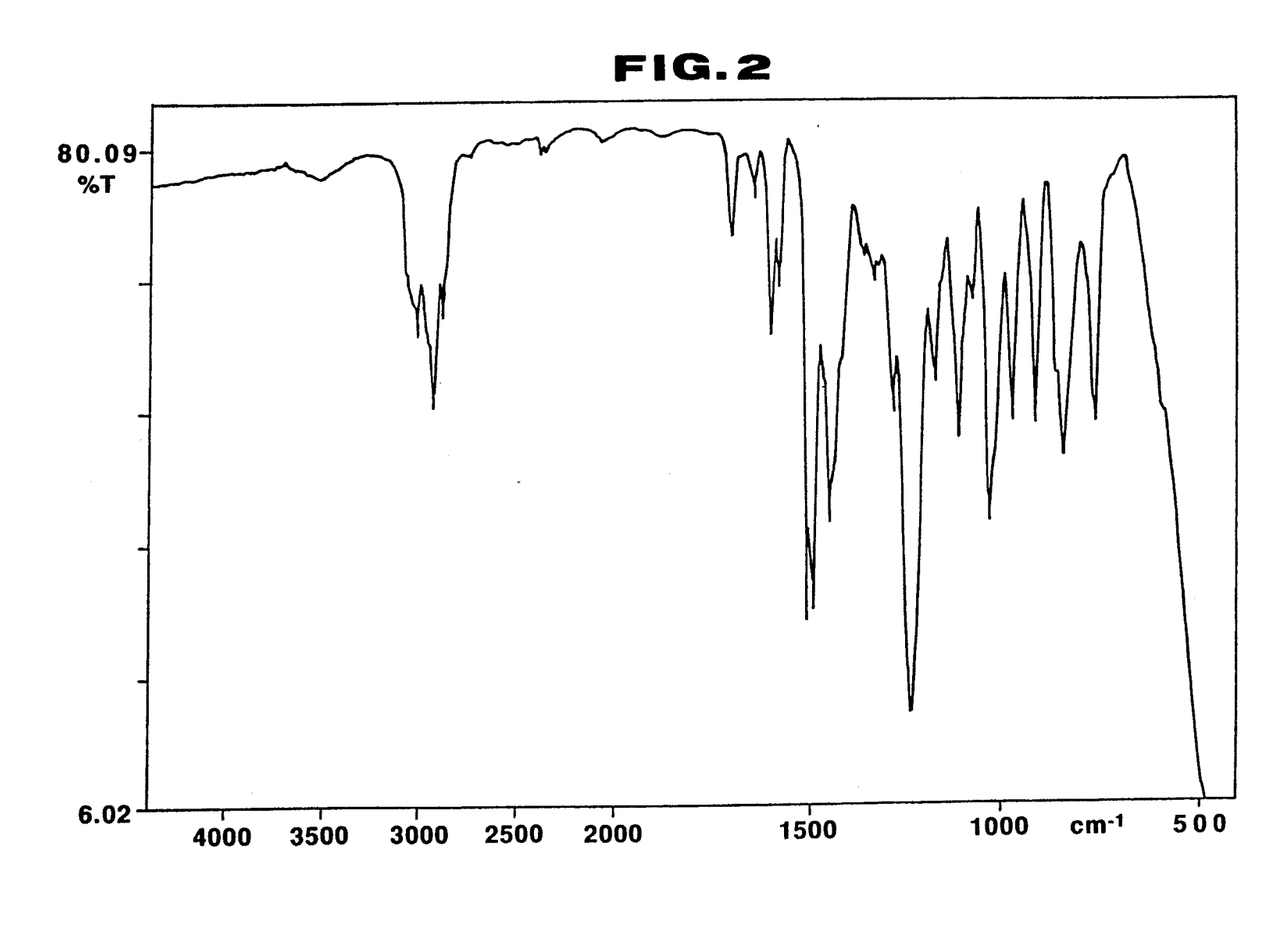

FIG. 2 is an infrared absorption spectrum of Compound F. The compound was analyzed for molecular weight by GPC, finding a number average molecule weight (Mn) of 561, a weight average molecule weight (Mw) of 595, and a polydispersion degree (Mw/Mn) of 1.06. An NMR spectrum of the compound was analyzed as follows.

Solvent: $CD_3COCD_3$

EXAMPLE 3

Synthesis of Compound G

A 2-liter, four-necked flask equipped with a condenser, thermometer, and stirrer was charged with 292 grams (1.0 mol) of triphenolmethane, 363 grams (3.0 mol) of allyl bromide, 414 grams (3.0 mol) of potassium carbonate, and 600 ml of acetone in a nitrogen atmosphere. Reaction was conducted for 8 hours under reflux. After removal of the solvent by stripping, the reaction product was dissolved in 600 ml of MIBK and washed with water. The solvent was removed again, leaving 350 grams of an allyl ether compound, designated Compound G, in a yield of 85%. Compound G was identified by NMR and IR analysis.

Compound G

Synthesis of Compound H

A 1-liter, four-necked flask equipped with a condenser, thermometer, and stirrer was charged with 350 grams (0.88 mol) of Compound G in a nitrogen atmosphere. With stirring, the flask was heated to effect reaction at 200° C. for 4 hours.

Thereafter, the reaction product was cooled down, obtaining 333 grams of a rearranged product, designated Compound H, having an OH equivalent of 139 (theory 137) in a yield of 95%. Compound H was identified by NMR and IR analysis.

Compound H

Synthesis of Compound I

A 2-liter, four-necked flask equipped with a condenser, thermometer, and stirrer was charged with 300 grams of Compound H in a nitrogen atmosphere. With stirring, 200 grams of methanol and 100 grams of n-butanol were added, and then 123 grams of KOH added. The flask was heated until the contents were dissolved, the methanol removed, and then reaction conducted at 110° to 120° C. for 6 hours. At the end of 6-hour reaction, 500 ml of MIBK was added to the reaction solution which was neutralized with hydrochloric acid. Removal of the solvent left 261 grams of a compound, designated Compound I, having an OH equivalent of 141 (theory 137) in a yield of 87%. Compound I was identified by NMR and IR analysis.

Compound I

Synthesis of Compound J

A 2-liter, four-necked flask equipped with a condenser, thermometer, and stirrer was charged with 200 grams of the propenyl-containing phenol or Compound I, 672 grams of epichlorohydrin, and 0.3 grams of trimethylammonium chloride. The contents were stirred for 3 hours under reflux. Then 117 grams of NaOH (50% aqueous solution) was added dropwise under a vacuum of 100 to 130 mmHg at 80° to 90° C. The reaction mixture was then aged for 2 hours. After filtration and stripping, the hydrolyzable chlorine was removed from the reaction mixture using NaOH solution (10% aqueous solution). Washing with water left 259 grams of a reaction product, designated Compound J, having an epoxy equivalent of 198 (theory 193) in a yield of 92%.

Compound J

Figure 3:
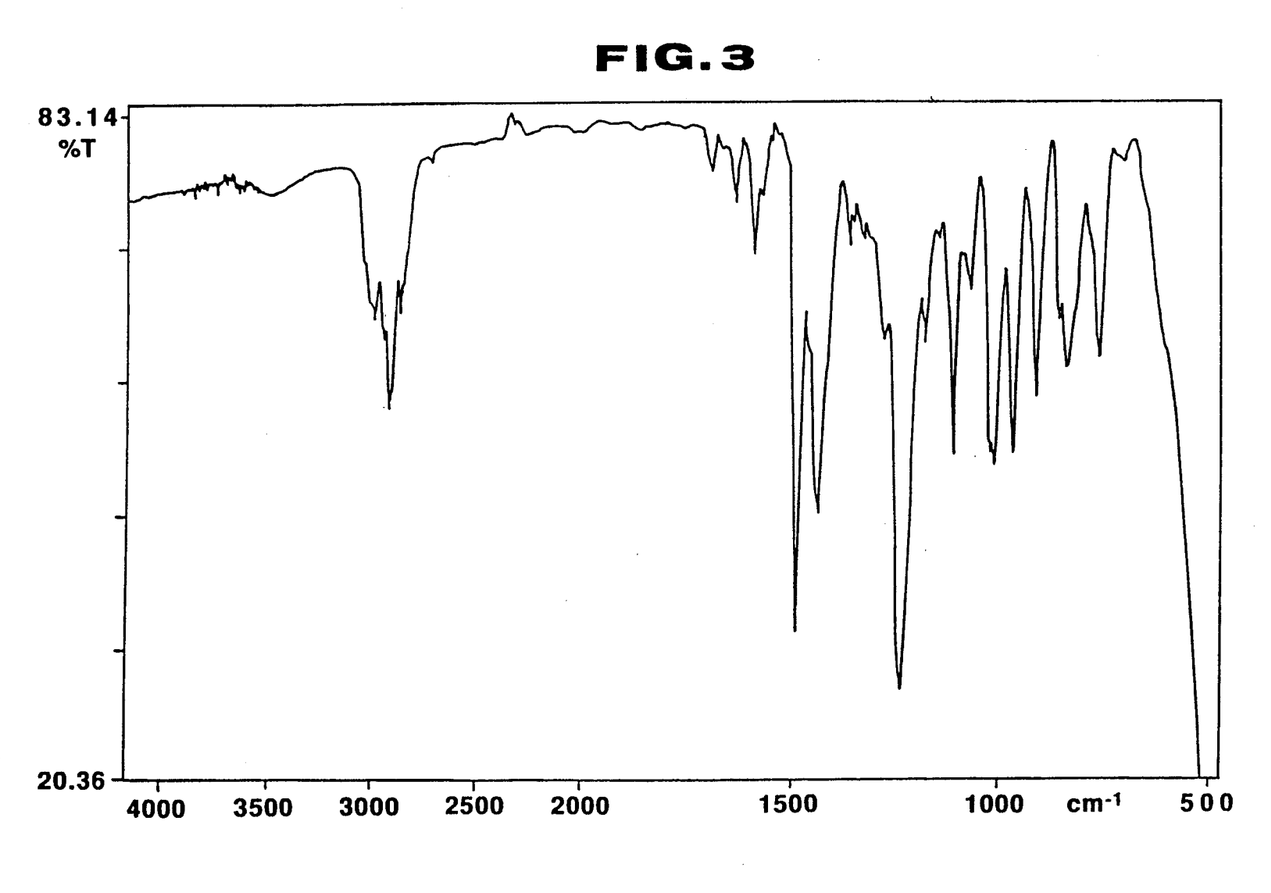

FIG. 3 is an infrared absorption spectrum of Compound J. The compound was analyzed for molecular weight by GPC, finding a number average molecule weight (Mn) of 592, a weight average molecule weight (Mw) of 616, and a polydispersion degree (Mw/Mn) of 1.04. An NMR spectrum of the compound was analyzed as follows.

Solvent: $CD_3COCD_3$ ppm[σ]

1.67, 1.77: $-CH=CH-\underline{CH_3}$ 2.59: $-\underline{CH}\overset{O}{-\!\!\!-\!\!\!-}CH_2$ 2.81: $-C_6H_2-\underline{CH}-$ 3.1~3.2: $-\underline{CH}\overset{O}{-\!\!\!-\!\!\!-}CH_2$

3.6~4.0: $-\underline{CH_2}-CH\overset{O}{-\!\!\!-\!\!\!-}CH_2$  $+C_6H_2-\underline{CH_2}+$ 5.6~6.2: $-\underline{CH=CH}-CH_3$ 6.7~7.2: $+C_6\underline{H_2}+$

EXAMPLE 4
Synthesis of Compound K

A 200-ml, four-necked flask equipped with a condenser, thermometer, and stirrer was charged with 10.8 grams (0.2 mol) of o-cresol and 16.2 grams (0.2 mol) of 37% formaldehyde aqueous solution in a nitrogen atmosphere. With stirring, 0.1 grams of NaOH was added and reaction conducted for 6 hours under reflux. Then, 29.2 grams (0.2 mol) of triphenolmethane, 2.4 grams of oxalic acid, and 100 grams of toluene were added to the flask and the reaction mixture was heated under toluene reflux for removing water. At the end of 2-hour heating, the toluene was removed under vacuum. The reaction mixture was then diluted with MIBK and removed of the solvent, leaving 42 grams of a phenolic resin having an OH equivalent of 109 (theory 107). Thereafter, the resin was subjected to allyl etherification, rearrangement, isomerization and epoxidization by the same procedures as in Examples 1 to 3, obtaining a compound, designated Compound K, having an epoxy equivalent of 206 (theory 203). Compound K was identified by NMR and IR analysis.

Compound K

Experiment

Two thermosetting resin compositions I and II were prepared by blending 50 parts by weight of N,N'-4,4'-diphenylmethanebismaleimide, Compounds B and C in the amounts shown in Table 1, and the remaining ingredients in the amounts shown in Table 1 and melt milling the blends in a hot twin-roll mill until the blends became uniform.

These two resin compositions were examined by the following tests.

Spiral flow

Spiral flow was measured using a mold according to the EMMI standards at 175° C. under a pressure of 70 kg/cm$^2$.

Flexural strength

According to JIS K-6911, test bars of 10×4×100 mm were prepared by molding for 2 minutes at 175° C. under a pressure of 70 kg/cm$^2$ and post curing for 4 hours at 180° C. The bars were measured for strength at 25° C. and 250° C.

Glass transition temperature

Using a dilatometer, test pieces having a diameter of 4 mm and a length of 15 mm were heated at a rate of 5° C./min.

The results are also shown in Table 1.

TABLE 1

| | Thermosetting resin composition | |
|---|---|---|
| | I | II |
| Composition, parts by weight | | |
| N,N'-4,4'-diphenylmethanebismaleimide | 50 | 50 |
| Compound B | — | 21 |
| Compound C | 29 | — |
| Phenolic resin* | 18 | — |
| Triphenylphosphine | 1.0 | 1.0 |
| Dicumyl peroxide | 0.5 | 0.5 |
| Quartz powder | 260 | 260 |
| γ-glycidoxypropyltrimethoxysilane | 1.5 | 1.5 |
| Wax E | 1.5 | 1.5 |
| Carbon black | 1.0 | 1.0 |
| Properties | | |
| Spiral flow, cm | 52 | 6 |
| Flexural strength @25° C., kg/mm$^2$ | 15.1 | 9.5 |
| Flexural strength @250° C., kg/mm$^2$ | 6.2 | 1.7 |
| Glass transition temperature, °C. | 320 | 205 |

*trade name TD-2093 by Dai-Nihon Ink K.K.

As is evident from Table 1, composition I using the propenyl-containing phenol novolak resin having an epoxy group (Compound C) has improved flow behavior, high flexural strength at elevated temperatures, and a high glass transition temperature as compared with composition II using the propenyl-containing phenol novolak resin free of epoxy (Compound B).

Although some preferred embodiments have been described, many modifications and variations may be made thereto in the light of the above teachings. It is therefore to be understood that within the scope of the appended claims, the invention may be practiced otherwise than as specifically described.

We claim:

1. A propenyl group-containing epoxy resin of the general formula:

wherein R$^1$ is hydrogen or a monovalent hydrocarbon group having 1 to 11 carbon atoms, X is hydrogen or a halogen atom, l is an integer of 0 to 50, and m is an integer of 1 to 50.

2. The propenyl group-containing epoxy resin recited in claim 1, wherein $R^1$ is hydrogen, methyl, ethyl, propyl, t-butyl, propenyl or phenyl, and

X is hydrogen, chlorine or bromine.

3. The propenyl group-containing epoxy resin recited in claim 1, wherein $R^1$ is hydrogen.

4. The propenyl group-containing epoxy resin recited in claim 1, wherein X is hydrogen.

5. The propenyl group-containing epoxy resin in claim 1, wherein $R^1$ is hydrogen and X is hydrogen.

6. A propenyl group-containing epoxy resin of the general formula:

wherein $R^1$ is hydrogen or a monovalent hydrocarbon group having 1 to 6 carbon atoms,
X is hydrogen or a halogen atom,
l is an integer of 0 to 50, and
m is an integer of 1 to 50.

7. The propenyl group-containing epoxy resin recited in claim 6, wherein
$R^1$ is hydrogen, methyl, ethyl, propyl, t-butyl, propenyl or phenyl, and
X is hydrogen, chlorine or bromine.

8. The propenyl group-containing epoxy resin recited in claim 6, wherein $R^1$ is hydrogen.

9. The propenyl group-containing epoxy resin recited in claim 6, wherein X is hydrogen.

10. The propenyl group-containing epoxy resin in claim 6, wherein $R^1$ is hydrogen and X is hydrogen.

* * * * *